(12) United States Patent
Abbas et al.

(10) Patent No.: US 8,040,919 B2
(45) Date of Patent: Oct. 18, 2011

(54) TRANSMISSION METHOD

(75) Inventors: Ghani Abdul Muttalib Abbas, Wollaton (GB); John David Ash, West Bridgford (GB)

(73) Assignee: Ericsson AB, Stockholm (SE)

( * ) Notice: Subject to any disclaimer, the term of this patent is extended or adjusted under 35 U.S.C. 154(b) by 909 days.

(21) Appl. No.: 10/475,901

(22) PCT Filed: Apr. 29, 2002

(86) PCT No.: PCT/GB02/01959
§ 371 (c)(1),
(2), (4) Date: May 4, 2004

(87) PCT Pub. No.: WO02/089375
PCT Pub. Date: Nov. 7, 2002

(65) Prior Publication Data
US 2004/0177169 A1    Sep. 9, 2004

(30) Foreign Application Priority Data
Apr. 27, 2001    (GB) .................................. 0110437.1

(51) Int. Cl.
*H04J 3/24* (2006.01)
(52) U.S. Cl. ........................................ 370/474; 370/907
(58) Field of Classification Search ........................ None
See application file for complete search history.

(56) References Cited

U.S. PATENT DOCUMENTS

| | | | |
|---|---|---|---|
| 5,841,764 A * | 11/1998 | Roderique et al. ............ | 370/310 |
| 5,857,092 A | 1/1999 | Nakamura et al. | |
| 5,867,490 A * | 2/1999 | Campanella ................... | 370/326 |
| 6,075,788 A * | 6/2000 | Vogel ........................ | 370/395.51 |
| 6,134,245 A * | 10/2000 | Scarmalis .................... | 370/474 |
| 6,144,645 A * | 11/2000 | Struhsaker et al. ............ | 370/280 |
| 6,169,754 B1 | 1/2001 | Sugawara et al. | |
| 6,826,192 B2 * | 11/2004 | Shimamura et al. .......... | 370/419 |
| 6,856,594 B1 * | 2/2005 | Aihara et al. ................. | 370/228 |
| 6,975,651 B1 * | 12/2005 | Ono et al. ..................... | 370/474 |
| 6,985,454 B1 * | 1/2006 | Wiedeman et al. ............ | 370/316 |
| 7,020,715 B2 * | 3/2006 | Venkataraman et al. ..... | 709/236 |
| 2001/0012289 A1 * | 8/2001 | Norman ........................ | 370/360 |
| 2001/0046239 A1 * | 11/2001 | Colombo et al. .............. | 370/474 |
| 2002/0085570 A1 * | 7/2002 | Yoshida et al. ............... | 370/404 |
| 2004/0213291 A1 * | 10/2004 | Beshai et al. ................. | 370/473 |
| 2006/0007885 A1 * | 1/2006 | Pollack et al. ................ | 370/328 |

FOREIGN PATENT DOCUMENTS
EP    0 924 901 A2    6/1999
(Continued)

*Primary Examiner* — Andrew Lai
*Assistant Examiner* — Jutai Kao
(74) *Attorney, Agent, or Firm* — Kirschstein, et al.

(57) ABSTRACT

A transmission method in which a first signal frame, carrying a payload in a first part of the signal frame and second information in a second part of the signal frame, is transmitted intact between a signal source and a signal destination by copying the second information into the first part of at least one additional signal frame, transmitting both frames between the signal source and the signal destination and, at the destination, reconstructing the first signal frame by retrieving its original second information from the first part or parts of the additional signal frame or frames and placing the retrieved second information in the second part of the first signal frame. A typical application of the transmission method lies in its use in an SDH transmission system.

21 Claims, 3 Drawing Sheets

FOREIGN PATENT DOCUMENTS

Figure 1:
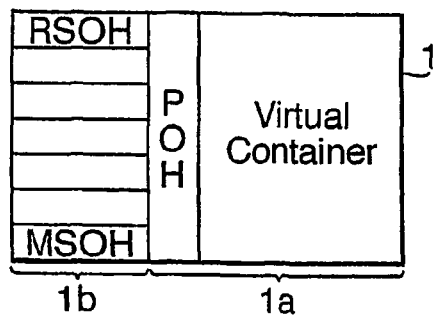

| | | |
|---|---|---|
| EP | 1 043 856 A2 | 10/2000 |
| EP | 1 087 636 A2 | 3/2001 |
| EP | 1 217 774 A2 | 6/2002 |
| WO | WO 99/48307 | 9/1999 |
| WO | WO 99/50986 | 10/1999 |

\* cited by examiner

TRANSMISSION METHOD

The invention relates to a transmission method.

The transmission method is especially suitable for transmitting a signal element which includes first information in a first part of the signal element and associated second information in a second part of the signal element for the management of the signal element as it is moved between a signal source and a signal destination, in a transmission system which may change at least some of the second information in the second part of the signal element as the signal element is moved between the signal source and the signal destination.

A signal frame of a digital transmission system is a signal element which includes information in a first part of the signal element and associated second information in a second part of the transmission element for the management of the signal element as it is moved between a signal source and a signal destination. In the transmission of a signal frame along signal stages between the signal source and the signal destination, the associated second information is modified at nodes between the stages.

The invention provides a transmission method for a first signal element which includes first information in a first part of the signal element and associated second information in a second part of the signal element for the management of the signal element as it is moved between a signal source and a signal destination, in a transmission system which may change at least some of the second information in the second part of the signal element as the signal element is moved between the signal source and the signal destination, including the steps of:

providing the second information also in the first part of at least one additional signal element, transmitting the first signal element and the additional signal element or the additional signal elements from a signal source to a signal destination and, at the signal destination, providing a new signal element in which the first information in its first part is the same as the first information in the first part of the first signal element and the information in its second part is the same as the second information in the first part of the additional signal element or elements, thereby providing the first signal element in substantially its original form at the signal destination.

Examples of the second information include transmission management instructions, routing management instructions, performance management information and configuration management information.

Preferably, the method includes the step of replacing the first signal element by an identical replacement signal element prior to transmission and using the replacement signal element in place of the first signal element during and after transmission.

Preferably, a method for transmitting a plurality of signal elements which include information in respective first parts of the signal elements and common associated second information in respective second parts of the signal elements for the management of the signal elements as they are moved between the same signal source and signal destination, including the steps of:

providing the common associated second information as for the plurality of signal elements in the first part of at least one additional signal element and, at the signal destination, providing a plurality of new signal elements in which the first information in their respective first parts is the same as the first information in the first parts of the plurality of signal elements and the second information in their respective second parts is the same as the second information in the first part of the additional signal element.

Preferably, the second information includes instructions for effecting the alignment of the signal elements at the destination and the method includes the step of using the second instructions to align the signal elements of the plurality of signal elements at the destination.

Preferably, a signal element is a signal frame that is transmitted over a digital communications system.

Preferably, the information carried in the or each additional signal frame is error protected.

Preferably, the information carried in the or each additional signal frame is subject to forward error correction (FEC).

An SDH network capable of so operating as to perform the transmission method on an SDH signal may be used to perform the method.

An SDH network capable of so operating as to perform the transmission method on a SONET signal may be used to perform the method.

A SONET network capable of so operating as to perform the transmission method on a SONET signal may be used to perform the method.

A SONET network capable of so operating as to perform the transmission method on an SDH signal may be used to perform the method.

An appropriately arranged SDH network element included in an SDH network provides an SDH network capable of so operating as to perform the transmission method on an SDH signal.

An appropriately arranged SDH network element included in an SDH network provides an SDH network capable of so operating as to perform the transmission method on a SONET signal.

An appropriately arranged SONET network element included in a SONET network provides a SONET network capable of so operating as to perform the transmission method on a SONET signal.

An appropriately arranged SONET network element included in a SONET network provides a SONET network capable of so operating as to perform the transmission method on an SDH signal.

Figure 2:
Figure 3:
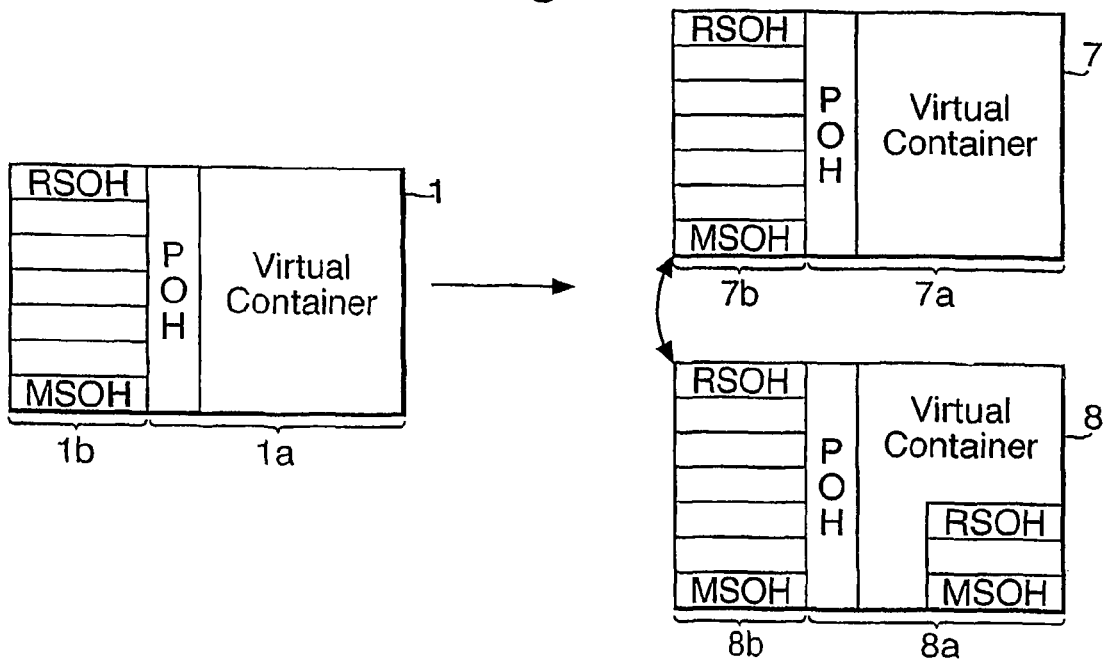
Figure 4:
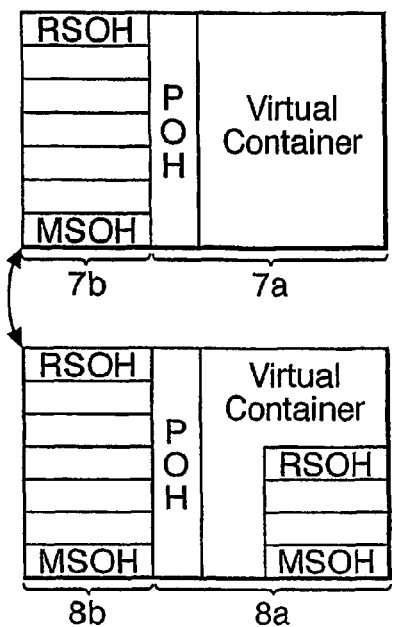
Figure 4:
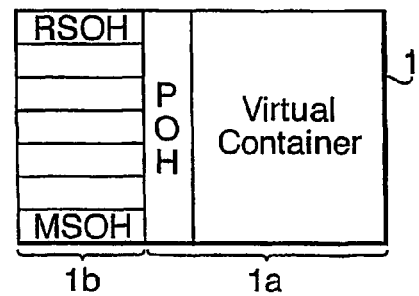
Figure 5:
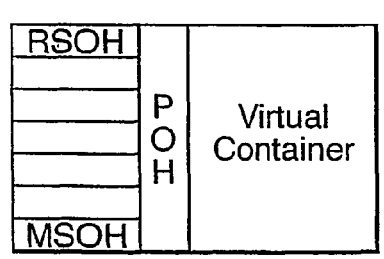
Figure 5:
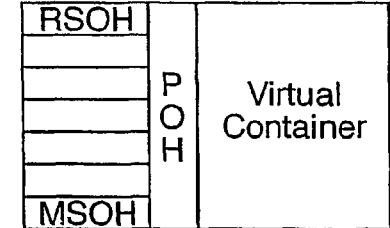
Figure 5:
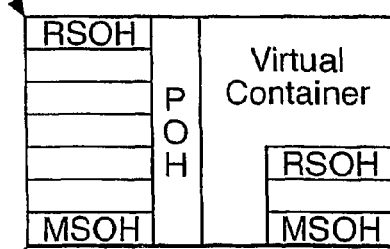
Figure 5:
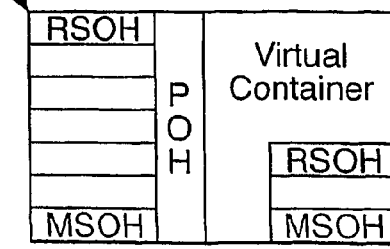
Figure 6:
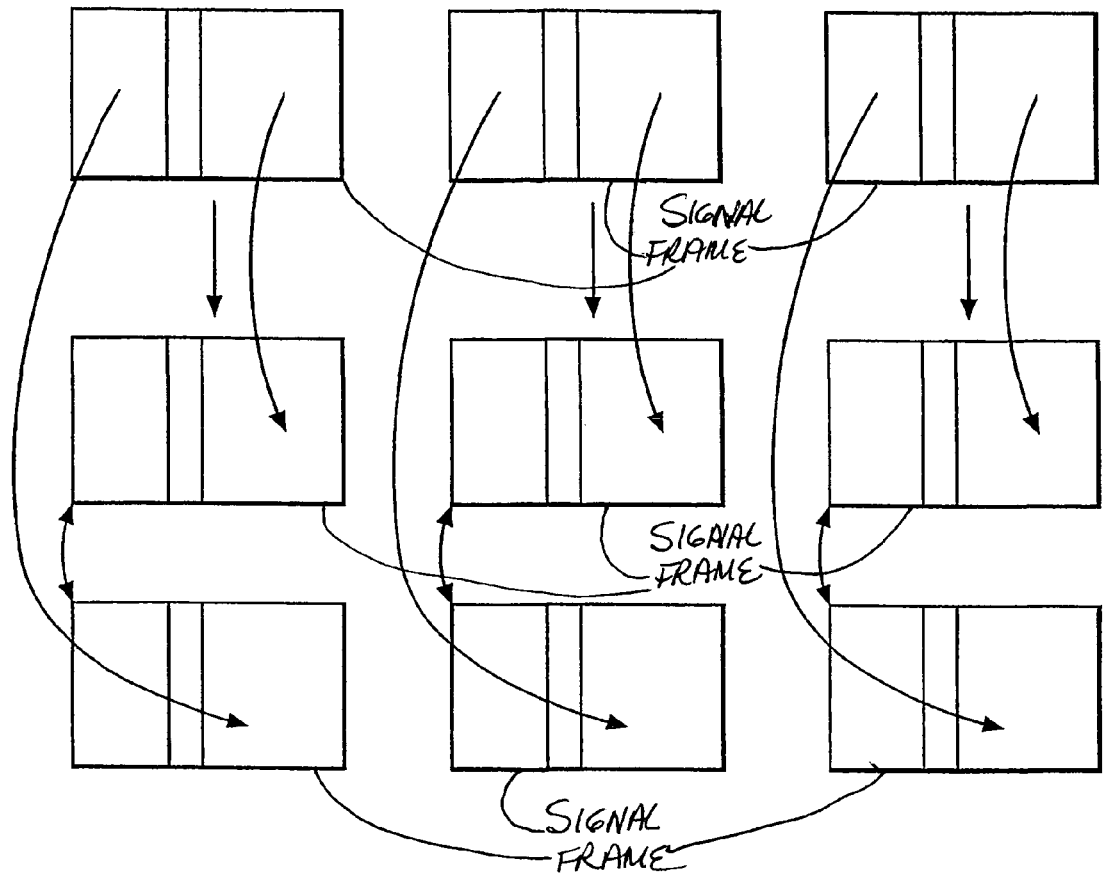
Figure 7:
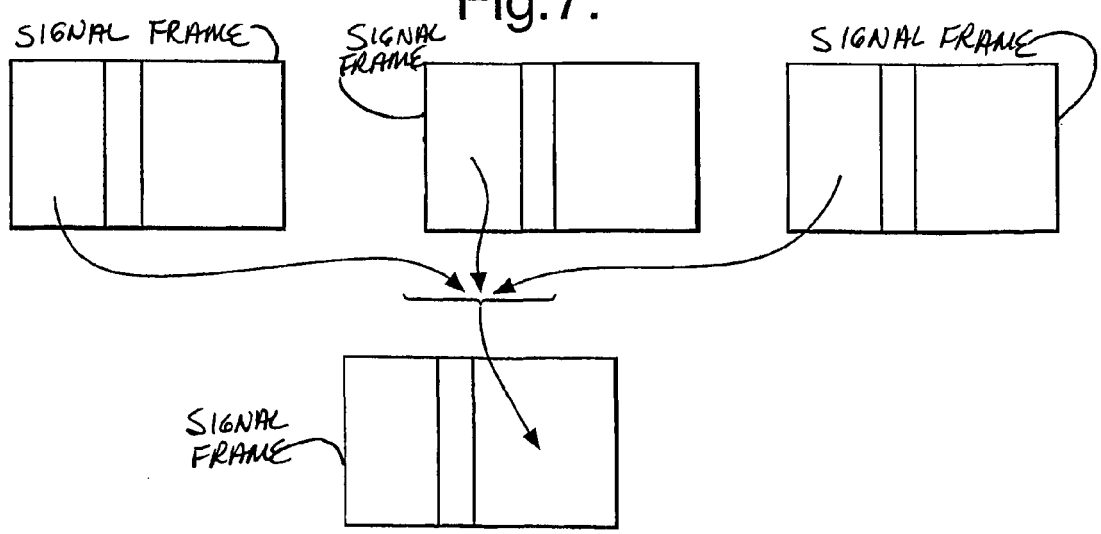

A method in accordance with the invention will now be described, by way of example only, with reference to the accompanying drawings in which:

FIG. 1 represents a frame of a Synchronous Digital Hierarchy (SDH) network as defined in an International Telecommunications Union (ITU) document G.707, FIG. 2 represents an SDH arrangement including first and second SDH network elements capable of generating signals in accordance with the invention connected to an SDH network, FIG. 3 shows the generation of two SDH frames from a single SDH frame in accordance with the invention, FIG. 4 shows the reduction of the two SDH frames of FIG. 3 to a single SDH frame in accordance with the invention, FIG. 5 shows the separation of an SDH frame into three associated SDH frames in accordance with the invention, FIG. 6 shows the separation of a plurality of SDH frames into associated pairs of SDH frames in accordance with the invention and FIG. 7 shows the provision of an additional SDH frame to a plurality of SDH frames in accordance with the invention.

With reference to FIG. 1 of the accompanying drawings, an SDH STM-1 frame 1 includes a first part 1a consisting of a Path Overhead (POH) and a Virtual Container (VC) for carrying first information as an SDH payload and a second part 1b for carrying second information including Multiplex Section Overhead (MSOH) and Regenerator Section Overhead (RSOH).

With reference to FIG. 2 of the accompanying drawings, an SDH arrangement includes an SDH network 4, a first SDH network element 3, capable of generating two frames from a single frame, connected to the input side of the SDH network 4 and a second SDH network element 5, capable of generating a single frame from two frames, connected to the output side of the SDH network 4. The first SDH network element 3 has an input port 2 and the second SDH network element 5 has an output port 6.

In the operation of the arrangement shown in FIG. 2, two SDH frames as shown in FIG. 3 are generated from an SDH signal frame that enters the input port 2 of the first SDH network element 3, the two frames pass through the SDH network 4 and the two frames reach the second SDH network element 5, which reverses the process as shown in FIG. 4 of the accompanying drawings.

With reference to FIG. 3 of the accompanying drawings, the signal frame 1 which is the same as the signal frame shown at FIG. 1 above, gives rise to two SDH frames 7 and 8. The payload of the VC and the POH of the frame 7 are the same as the corresponding parameters of the frame 1. The RSOH and MSOH may be, but need not be, the same as the corresponding parameters of the frame 1. A part or all of the payload of the VC of the frame 8 consists of RSOH and MSOH of the frame 1. The RSOH for the frame 8 differs from the RSOH for the frame 1 because RSOH is payload-dependent and the MSOH of the frame 7 may be, but need not be, the same as the MSOH of the frame 1. The RSOH and the MSOH of the frames 1, 7 and 8 are generated in accordance with the provisions of the ITU document G.707 referred to above.

The generation of the two frames 7 and 8 from the frame 1 is carried out by the first SDH network element 3 of FIG. 2 and the first SDH network element 3 presents the two frames 7 and 8 to the input of the SDH network 4.

The frames 7 and 8 are presented to the SDH network 4 instead of the frame 1. The SDH network 4 moves the frames 7 and 8 to the same destination. The frames 7 and 8 are delivered to the second SDH network element 5 with their original payloads in their first parts 7a and 8a. It is, of course necessary to be able to distinguish the frame 7 from the frame 8 either by the sequence of their transmission or in some other way.

The second SDH network element 5 so operates as to provide the original signal frame 1 including its original payload in its first part 1a and its original second information in its second part 1b. The result is effected by retrieving the payloads from the signal frames 7 and 8, the payloads remaining unchanged as the signal frames 7 and 8 pass through the SDH network 4. The payload from the first part 7a of the signal frame 7 is the same as the payload of the first part 1a of the signal frame 1 and the payload of the first part 8a of the signal frame 8 is the same as the RSOH and MSOH of the second part 1b of the signal frame 1. The modified RSOH and MSOH of the second parts 7b and 8b of the signal frames 7 and 8 are processed as appropriate.

The reconstructed signal frame 1 is, in effect, the same as the original signal frame 1 in all respects and is transmitted from the output port 6 of the digital transmission system. FIG. 4 of the accompanying drawings illustrates the provision of the original frame 1 from frames 7 and 8.

The second SDH network element 5 is capable of acting in the opposite sense, permitting the transmission of an SDH frame from the port 6, through the second SDH network element 5 to the SDH network 4. In that case, the second SDH network element 5 performs as did the first SDH network element 3 to generate two frames from a single input frame. Further, the first SDH network element 3 then operates in reverse and provides a single frame from the two frames generated by the second SDH network element 5.

In the event that a single additional frame does not have the VC capacity to carry the RSOH and MSOH, more than one additional frame may be used as is shown in FIG. 5 of the accompanying drawings. As is indicated above, steps need to be taken in order to distinguish the frames from one another in order that the first and second information payloads are correctly identified.

FIG. 6 illustrates the transmission method applied to a plurality of signal frames, carrying differing second information, by the provision of a pair of frames in place of each frame. One of the pair of frames carries a copy of the first information from the original frame as its first information and the second of the pair of frames carries the second information from the original frame in its first part, that is, as its first information.

The above transmission method may also be applied to a plurality of signal frames, carrying common second information, being transported between the same source and destination, by the provision of an additional signal frame that carries the common second information of the plurality of signal frames in its first part. The procedure is that the original plurality of signal frames is reconstructed at the destination by reintroducing the original common second information into the second parts of the plurality of signal frames by extracting that common information from the first part of the additional signal frame. That arrangement is represented by FIG. 7 of the accompanying drawings.

The second information can include instructions for effecting the alignment of the signal elements at the destination. In that case the instructions for effecting the alignment of the signal elements is included in a further signal frame, that is, a further frame to those shown in FIG. 5 or FIG. 6, the second information being retrieved and used to align the signal elements of the plurality of signal elements at the destination.

The above transmission method is especially applicable to a Synchronous Digital Hierarchy (SDH) network as defined by documents published by the International Telecommunications Union (ITU), including their document G.707, in which a basic signal frame called a Synchronous Transport Module level 1 [STM-1] may be transmitted.

In relation to the above transmission method, an STM-1 is a single frame including a first part for carrying a payload and a second part for carrying management information, as shown in FIG. 1, including, for example, routing management information, transmission management information, performance management information or configuration management information or a combination of the types of management information (RSOH, PTR, MSOH).

The first part of an STM-1 is called a Virtual Container-n (VC-n) and several standard capacities of VC-n are available as identified below:

| VC type | VC bandwidth | VC payload |
| --- | --- | --- |
| VC-11 | 1664 kbits/s | 1600 kbits/s |
| VC-12 | 2240 kbits/s | 2176 kbits/s |
| VC-2 | 6848 kbits/s | 6784 kbits/s |
| VC-3 | 48960 kbits/s | 48384 kbits/s |
| VC-4 | 150336 kbits/s | 149760 kbits/s |
| VC-4-4c | 601344 kbits/s | 599040 kbits/s |
| VC-4-16c | 2405376 kbits/s | 2396160 kbits/s |

-continued

| VC type | VC bandwidth | VC payload |
|---|---|---|
| VC-4-64c | 9621504 kbits/s | 9584640 kbits/s |
| VC-4-256c | 38486016 kbits/s | 38338560 kbits/s |

The Virtual Container types VC-n-Xc (VC-4-4c, VC-4-16c, VC-4-64c and VC-4-256c) are X Continuously concatenated VC-ns, which are a multiplicity of Virtual Containers associated one with another with the result that their combined capacity can be used as a single container across which bit sequence integrity is maintained.

The second part of an STM-1 carries a section overhead which is management information including routing and transmission management information including Regenerator Section Overhead (RSOH) and Multiplex Section Overhead (MSOH). Also carried in the second part of an STM-1 are information elements identified as J1, B3, C2, G1, F2, H4, F3, K3 and N1.

The following is an example of the above transmission method applied to an STM-1. All of the parameters referred to below are defined in the document G.707:

(a) The original payload, a VC-4, is mapped into a new VC-4.
(b) All of the section overhead [SOH] (ie RSOH and MSOH) is mapped into three concatenated VC-12s. As an alternative they may be mapped into four VC-11s or into any other plurality of VCs including VC-2s, VC-3s or VC-4s. As is indicated above, a multiplicity of Virtual Containers associated one with another with the result that their combined capacity can be used as a single container across which bit sequence integrity is maintained provide concatenated containers.
(c) As an alternative to (b) above, more efficient bandwidth utilisation is achieved by mapping some but not all of the section overhead, for example, by not mapping the framing word and the NU (not used) bytes, reducing the number of VCs required to transport the RSOH and MSOH. When that is done, only two VC-12s or three VC-11s are required for the section overhead.
(d) The same frame sequence coding as that used in the H4 bit position for virtual concatenation is used to align the VC-4 frame of the originating STM-1 with the frames of the concatenated VCs, the coding being placed in any unused byte in the path overhead, for example, the K3 byte.

Alternatively, an eighth bit is generated by multi-framing any number of bits in the path overhead to generate an eight-bit code for the VC-4 frame sequencing. For example, bits 5 and 6 which are not used in the K3 bit position are four-frame multi-framed to generate an eighth bit which is treated like an H4 bit to produce the VC-4 frame sequence. The value of the frame sequence is copied to one of the unused bytes in the SOH, for example, the byte with co-ordinates 1, 2, 6 as defined in G,707.

(e) A new signal label code, to indicate the type of payload being transported, is inserted into the C2 bit position. For example, the code 1110 0001 may be used.
(f) The VC-4s and the SOH of the originating STM-1, which are transported over the SDH network, may be error-protected by using in band or out of band Forward Error Correction (FEC).

Other Synchronous Transport Modules which a Synchronous Digital Hierarchy is capable of accommodating include STM-4, STM-16, STM-64 and STM-256 which include, respectively, a VC-4-4c, VC-4-16c, VC-4-64c and VC-4-256c which are identified above.

The transmission method is applicable to the other STMs by providing second information which is the same for the Virtual Containers in the payload part of at least one additional signal frame and providing further signal frames in the payload parts of which are placed alignment instructions for and linked to the respective signal frames. At the destination, the second information and the alignment instructions are retrieved from the payloads of the additional and further signal frames and reassembled into the originating STM.

The transmission method is applicable to the transmission over SDH of signal frames dedicated to digital transmission systems including other forms of networks, for example, Synchronous Optical NETworks (SONET) meeting American standards (ANSI). In that case, the SONET SOH is mapped into one or more VCs of appropriate size (one VC-11 or VC-12 or any other VC) and the SONET Synchronous Payload Envelope (SPE) is mapped to a VC-3. The SONET SPE is the counterpart of the SDH payload.

Using the transmission method, an SDH signal or a SONET signal may be transmitted over an SDH network by suitable choices of SDH VC in accordance with the respective amounts of first and second information involved. Alternatively, using the transmission method, an SDH signal or a SONET signal may be transmitted over a SONET network by suitable choices of SONET VC in accordance with the respective amounts of first and second information involved.

FIGS. 1 to 7 which relate to SDH systems are equally applicable to SONET systems by appropriate adjustment of the amounts of the first and second information involved and terminology.

With reference to FIG. 2, the SDH network element 3 is as defined in an ITU document G.783 for SDH compatibility but so modified, possibly by the inclusion of additional hardware and software, as to perform the functions of separating a frame into two frames as shown in FIG. 3, for signal flow in one direction, and reconstructing an original frame from two frames as shown in FIG. 4, for signal flow in the opposite direction. The same applies to the SDH network element 5 shown in FIG. 2.

Equivalent SONET network elements corresponding to the SDH network elements 3 and 5 are obtained by the appropriate adjustments to deal with the differences between the standards involved.

The invention claimed is:

1. A method of transmitting data, comprising the steps of:
receiving the data in an original signal frame suitable for transmission across a synchronous network, the original signal frame including a first part containing first information and a second part containing second management information;
transmitting the data between a signal source and a signal destination in the synchronous network capable of changing the second management information if the original signal frame were transmitted;
generating two intermediate frames from the original signal frame during data transmission over the synchronous network;
containing all of the first information in a first part of one of the intermediate frames, all of the first information remaining unchanged during the data transmission over the synchronous network;
containing the second management information in a first part of the other of the intermediate frames, the second management information remaining unchanged during the data transmission over the synchronous network;
retrieving the unchanged first information from the first part of the one intermediate frame;

retrieving the unchanged second management information from the first part of the other intermediate frame; and generating from the retrieved unchanged information a reconstructed signal frame that is identical to the original signal frame.

2. The method as claimed in claim 1, wherein the second management information of the original signal frame comprises transmission and routing instructions.

3. The method as claimed in claim 1, wherein the generating step is performed by generating an additional intermediate frame including a first part for containing a part of the second management information when the other intermediate frame has insufficient capacity to contain all of the second management information.

4. The method as claimed in claim 1, and configuring the original signal frame as a plurality of signal frames, and providing alignment instructions for aligning the plurality of signal frames.

5. The method as claimed in claim 1, and error protecting the data.

6. The method as claimed in claim 5, and subjecting the data to forward error correction (FEC).

7. The method as claimed in claim 1, wherein the synchronous network is a synchronous digital hierarchy (SDH) network, and wherein the original signal frame is an SDH signal frame.

8. The method as claimed in claim 1, wherein the synchronous network is a synchronous digital hierarchy (SDH) network, and wherein the original signal frame is a synchronous optical network (SONET) signal frame.

9. The method as claimed in claim 1, wherein the synchronous network is a synchronous optical network (SONET), and wherein the original signal frame is a SONET signal frame.

10. The method as claimed in claim 1, wherein the synchronous network is a synchronous optical network (SONET), and wherein the original signal frame is a synchronous digital hierarchy (SDH) signal frame.

11. The method as claimed in claim 7, wherein the generating and retrieving steps are performed by SDH network elements.

12. The method as claimed in claim 8, wherein the generating and retrieving steps are performed by SDH network elements.

13. The method as claimed in claim 9, wherein the generating and retrieving steps are performed by SONET network elements.

14. The method as claimed in claim 10, wherein the generating and retrieving steps are performed by SONET network elements.

15. An arrangement for transmitting data contained in an original signal frame suitable for transmission across a synchronous network, the original signal frame including a first part containing first information and a second part containing second management information, comprising:

the synchronous network being operative for transmitting the data between a signal source and a signal destination, the synchronous network being capable of changing the second management information if the original signal frame were transmitted;

a transmit network element operatively connected to the signal source, for generating two intermediate frames from the original signal frame during data transmission over the synchronous network, one of the intermediate frames including a first part containing all of the first information, the first information remaining unchanged during the data transmission over the synchronous network, and the other of the intermediate frames including a first part containing the second management information that remains unchanged during the data transmission over the synchronous network; and a receive network element operatively connected to the signal destination, for retrieving the unchanged first information from the first part of the one intermediate frame, for retrieving the unchanged second management information from the first part of the other intermediate frame, and for generating from the retrieved unchanged information a reconstructed signal frame that is identical to the original signal frame.

16. A transmit network element for transmitting data in an original signal frame suitable for transmission across a synchronous network, the original signal frame including a first part containing first information and a second part containing second management information, the transmit network element comprising:

an input of the transmit network element being operatively connected to a signal source in the synchronous network capable of changing the second management information if the original signal frame were transmitted;

the transmit network element being operative for generating two intermediate frames from the original signal frame during data transmission over the synchronous network, one of the intermediate frames including a first part containing all of the first information, the first information remaining unchanged during the data transmission over the synchronous network, and the other of the intermediate frames including a first part containing the second management information that remains unchanged during the data transmission over the synchronous network; and an output of the transmit network element for outputting the unchanged information from the two intermediate frames toward a signal destination of the synchronous network.

17. A method of transmitting data, comprising the steps of:

receiving the data in an original signal frame suitable for transmission across a synchronous network, the original signal frame including a first part containing first information and a second part containing second management information;

transmitting the data between a signal source and a signal destination in the synchronous network capable of changing the second management information if the original signal frame were transmitted;

operatively connecting a transmit network element to the signal source;

generating two intermediate frames from the original signal frame by operation of the transmit network element during data transmission over the synchronous network, one of the intermediate frames including a first part containing all of the first information, the first information remaining unchanged during the data transmission over the synchronous network, and the other of the intermediate frames including a first part containing the second management information that remains unchanged during the data transmission over the synchronous network; and outputting the unchanged information from the two intermediate frames from the transmit network element toward the signal destination of the synchronous network.

18. A receive network element for receiving data in a reconstructed signal frame that is identical to an original signal frame suitable for transmission across a synchronous network, the original signal frame including a first part containing first information and a second part containing second management information, the receive network element comprising:

an input of the receive network element for receiving two intermediate frames from the original signal frame from a signal source of the synchronous network capable of changing the second management information if the original signal frame were transmitted, one of the intermediate frames including a first part containing all of the first information that remains unchanged during data reception over the synchronous network, and the other of the intermediate frames including a first part containing the second management information that remains unchanged during the data reception over the synchronous network; and the receive network element being operative for retrieving the unchanged first information from the first part of the one intermediate frame, for retrieving the unchanged second management information from the first part of the other intermediate frame, and for generating the reconstructed signal frame from the retrieved unchanged information.

19. The receive network element as claimed in claim 18, and comprising an output of the receive network element being operatively connected to the signal destination of the synchronous network for outputting the reconstructed signal frame toward the signal destination of the synchronous network.

20. A method of receiving data in a reconstructed signal frame that is identical to an original signal frame suitable for transmission across a synchronous network, the method comprising the steps of:

receiving the data in the original signal frame with a first part containing first information and a second part containing second management information;

transmitting the data between a signal source and a signal destination in the synchronous network capable of changing the second management information if the original signal frame were transmitted;

operatively connecting a receive network element to the signal destination;

receiving two intermediate frames from the original signal frame from the signal source during data reception over the synchronous network, one of the intermediate frames including a first part containing all of the first information, the first information remaining unchanged during the data reception over the synchronous network, and the other of the intermediate frames including a first part containing the second management information that remains unchanged during the data reception over the synchronous network;

retrieving the unchanged first information from the first part of the one intermediate frame;

retrieving the unchanged second management information from the first part of the other intermediate frame; and generating the reconstructed signal frame from the retrieved unchanged information, by operation of the receive network element.

21. The method as claimed in claim 20, and outputting the reconstructed signal frame from the receive network element toward the signal destination of the synchronous network.

* * * * *